United States Patent
Kang et al.

(10) Patent No.: US 10,761,255 B2
(45) Date of Patent: Sep. 1, 2020

(54) LIGHT GUIDE

(71) Applicants: Hyundai Motor Company, Seoul (KR); Kia Motors Corporation, Seoul (KR)

(72) Inventors: Chan Hee Kang, Gyeonggi-do (KR); Yang Jin Kwon, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 53 days.

(21) Appl. No.: 16/172,799

(22) Filed: Oct. 28, 2018

(65) Prior Publication Data

US 2019/0187358 A1 Jun. 20, 2019

(30) Foreign Application Priority Data

Dec. 18, 2017 (KR) .................. 10-2017-0174561

(51) Int. Cl.
*F21V 8/00* (2006.01)
*B60Q 3/62* (2017.01)

(52) U.S. Cl.
CPC ............ *G02B 6/0028* (2013.01); *B60Q 3/62* (2017.02); *G02B 6/001* (2013.01); *G02B 6/0018* (2013.01); *G02B 6/0043* (2013.01); *G02B 6/0055* (2013.01); *G02B 6/0058* (2013.01)

(58) Field of Classification Search
None
See application file for complete search history.

(56) References Cited

U.S. PATENT DOCUMENTS

| | | | |
|---|---|---|---|
| 10,011,769 B2* | 7/2018 | Hong | C09K 11/7734 |
| 10,078,173 B2* | 9/2018 | You | G02B 6/357 |
| 10,139,546 B2* | 11/2018 | Kim | G02B 6/0038 |
| 10,180,229 B2* | 1/2019 | Ahn | F21S 43/239 |
| 10,216,054 B2* | 2/2019 | Ota | G02F 1/1362 |
| 10,353,244 B2* | 7/2019 | Ou | G02B 6/0031 |
| 2011/0211368 A1* | 9/2011 | Mishima | G02B 6/002 362/619 |
| 2014/0071653 A1* | 3/2014 | Thompson | G02B 6/005 362/19 |
| 2015/0234114 A1* | 8/2015 | Nakashima | G02B 6/0036 362/611 |
| 2016/0109643 A1* | 4/2016 | Teragawa | G02B 6/0055 362/624 |
| 2017/0003439 A1* | 1/2017 | Lee | G02B 6/0058 |
| 2017/0242182 A1* | 8/2017 | Diana | G02B 6/0068 |
| 2018/0284338 A1* | 10/2018 | Wang | G02B 6/0043 |

* cited by examiner

*Primary Examiner* — Britt D Hanley
(74) *Attorney, Agent, or Firm* — Mintz Levin Cohn Ferris Glovsky and Popeo, P.C.; Peter F. Corless (57) ABSTRACT

Disclosed is a light guide including a core bar of a transparent material extended in a length direction from a first side to a second; and a plurality of reflection parts printed in parallel along with the length direction of the core bar on the outer surface; wherein spaces between the reflection parts are the same or decreased from the first side of the core bar toward the second side of the core bar.

11 Claims, 5 Drawing Sheets

LIGHT GUIDE

CROSS-REFERENCE TO RELATED APPLICATION

This application claims priority to and the benefit of Korean Patent Application No. 10-2017-0174561 filed in the Korean Intellectual Property Office on Dec. 18, 2017, the entire contents of which are incorporated herein by reference.

TECHNICAL FIELD

The present invention relates to a light guide that may provide a high and uniform luminance.

BACKGROUND

Figure 1:
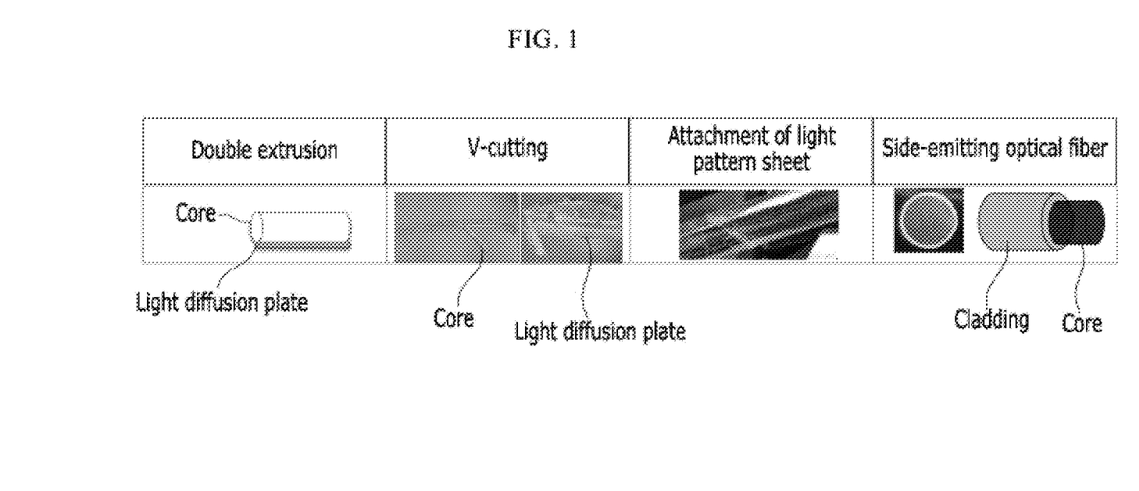
FIG. 1 is a view showing a conventional light guide according to the related art.

In the related arts, a light guide includes a core and a light diffusion plate that are formed simultaneously extruded by a double extrusion as shown in FIG. 1. Such a conventional light guide may have several problems. For example, the light source may be not controlled, the luminance is not uniform, and an excessively heated region (hot spot) is found at a leader. Moreover, in a light guide that a core is produced by an extrusion or an injection and a V-cut is etched on the side thereof, the side luminous efficiency is unfavorable in spite of adding a separated light diffusion plate produced by an injection, and further space is required when adding the light diffusion plate. In addition, a light guide may include a light pattern sheet attached to a core, however, the sheet may be frequently delaminated due to the attachment property. When a light guide include a side light emitting optical fiber, sufficient brightness is not obtained, and the excessively heater region (Hot Spot) may occur at a leader, despite a merit of emitting the light source in all direction of 360 degrees.

SUMMARY

In preferred aspects, provided is a light guide having a high luminance and a uniformity. The light guide may include a reflection part printed using a light spreading ink composition on the outer surface of a core bar formed of a transparent material. In particular, spaces between the reflection parts may be controlled.

In one aspect, provided is a light guide that may include a core bar of a transparent material extended in a length direction from a first side to a second side; and a plurality of reflection parts printed in parallel along with the length direction of the core bar on the outer surface.

The term "transparent" material as used herein may refer to a material having substantial transmittance of a fraction of light, such as visible light, UV light and the like. For instance, substantial amount of visible light such as of about 50%, about 60%, about 70%, about 80%, about 90%, about 95%, about 99%, or greater thereof may transmit or pass through the transparent material or resin. Such transmittance may be measured, for example, by spectrophotometer at a visible light wavelength of about 400-700 nm.

Preferably, spaces between the reflection parts may be the same or decreased from the first side of the core bar toward the second side of the core bar. It may be divided into i) an irradiation region disposed at an end portion of the first side of the core bar and not printed with the reflection part and ii) a reflection region disposed towards the second side of the core bar and printed with a plurality of reflection parts. For example, the reflection region may be disposed adjacent to the irradiation region at its end towards the second side. A length ratio of the irradiation region and the reflection region may suitably be about 1:23 to 1:27.

The reflection region may be divided into a plurality of regions from the first side to the second side. Preferably, a minimum space between the reflection parts printed in a region toward the second side may be narrower than a minimum space between the reflection parts printed in a region toward the first side in one side region, and the space between the reflection parts printed in any one region may be the same. As should be understood "minimum space" between features will be the shortest or more direct measured spaces between features.

Preferably, the reflection part may have a rectangular shape including a short side and a long side, wherein the short side of the rectangle may be disposed parallel to the length direction of the core bar. A ratio of the short side and the long side of the rectangle may suitably be about 1:1.2 to 1:3.

In certain aspects, the plurality of regions may be divided into five regions: a first region from the first side, a second region adjacent to the first region from the first side, a third region adjacent to the second region from the first side, a fourth region adjacent to the third region from the first side, and a fifth region adjacent to the fourth region from the first side.

Preferably, the ratio of short side length of the reflection part and the minimum space between the reflection parts may be about 1:6 to 1:7 in the first region; the ratio of short side length of the reflection part and the minimum space between the reflection parts may be about 1:4 to 1:5 in the second region; the ratio of short side length of the reflection part and the minimum space between the reflection parts may be about 1:2 to 1:3 in the third region; the ratio of short side length of the reflection part and the minimum space between the reflection parts may be about 1:1 to 1:1.5 in the fourth region; and the ratio of short side length of the reflection part and the minimum space between the reflection parts may be about 1:0.5 to 1:1 in the fifth region.

The reflection part may include a light spreading ink composition that may include an amount of about 20 to 80 wt % of an acryl-based copolymer resin; an amount of about 10 to 70 wt % of a light spreading agent including at least one of a silicone bead and an acrylic bead; and an amount of about 3 to 20 wt % of a light spreading auxiliary agent including at least one of titanium dioxide ($TiO_2$) and zinc oxide (ZnO), all the wt % are based on the total weight of the light spreading ink composition. An average particle size of the light spreading agent may be about 0.8 to 4.0 μm. Preferably, at least one or more of the reflection pats, or the plurality of the reflection parts may be printed with the light spreading ink composition.

The term "light spreading agent" as used herein may include a material dispersing the light transmitted in the resin. The light spreading agent may be formed in a particle shape and the transmitted light may be dispersed or scattered on the surface of the particles.

The term "light spreading auxiliary agent" as used herein refers to a material that has light scattering and reflection properties, e.g., visible light reflection such that it may provide whitening effect as included in the resin. The light spreading auxiliary agent may be formed in a particle having a size ranging from sub-nanometer to sub-micrometer, however, size and the shape thereof are not limited.

Further provided is a composition for reflecting light. The composition may include an amount of about 20 to 80 wt % of an acryl-based copolymer resin; an amount of about 10 to 70 wt % of a light spreading agent including at least one of a silicone bead and an acrylic bead; and an amount of about 3 to 20 wt % of a light spreading auxiliary agent including at least one of titanium dioxide ($TiO_2$) and zinc oxide (ZnO), all the wt % are based on the total weight of the light spreading ink composition. Preferably, an average particle size of the silicone bead and the acrylic bead in the light spreading agent is from about 0.8 to about 4.0 μm.

Still further provided is a vehicle part that may include the light guide as described herein.

Also provide is a vehicle that may include the light guide as described herein.

Accordingly, the present invention may provide a light guide having high and uniform luminance by printing the reflection part formed of the light spreading ink composition on the outside surface of the core bar formed of the transparent material while adjusting the interval therebetween.

Other aspects of the invention are disclosed infra.

The drawings are accompanied with the following reference numbers:

10: light source
100: core bar
110: irradiation region
120: reflection region
121: a first reflection region
122: a second reflection region
123: a third reflection region
124: a fourth reflection region
125: a fifth reflection region
200: reflection part

DETAILED DESCRIPTION

Terms such as first, second, and third are used to illustrate various portions, components, regions, layers, and/or sections, but not to limit them. These terms are used to discriminate the portions, components, regions, layers, or sections from other portions, components, regions, layers, or sections. Therefore, a first portion, component, region, layer, or section as described below may be a second portion, component, region, layer, or section within the scope of the present invention.

It is to be understood that the terminology used therein is only for the purpose of describing particular embodiments and is not intended to be limiting. It must be noted that, as used in the specification and the appended claims, the singular forms include plural references unless the context clearly dictates otherwise. It will be further understood that the terms "comprises" and/or "comprising," when used in this specification, specify the presence of stated properties, regions, integers, steps, operations, elements, and/or components, but do not preclude the presence or addition of one or more other properties, regions, integers, steps, operations, elements, and/or components thereof. As used herein, the singular forms "a," "an" and "the" are intended to include the plural forms as well, unless the context clearly indicates otherwise.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that when an element is referred to as being "on" another element, it can be directly on the other element or intervening elements may also be present. In contrast, when an element is referred to as being "directly on" another element, there are no intervening elements present. Unless it is mentioned otherwise, all terms including technical terms and scientific terms used herein have the same meaning as the meaning generally understood by a person with ordinary skill in the art to which the present invention belongs. The terminologies that are defined previously are further understood to have the meanings that coincide with related technical documents and the contents that are currently disclosed, but are not to be interpreted as having ideal or very official meanings unless defined otherwise.

In addition, % indicates wt % and 1 ppm indicates 0.0001 wt % unless the context clearly indicates otherwise.

Hereinafter, example embodiments of the present invention will be described more fully so that a person skilled in the art of the present invention may easily implement the invention. As those skilled in the art would realize, the described embodiments may be modified in various different ways, all without departing from the spirit or scope of the present invention.

Light Guide

Figure 2:
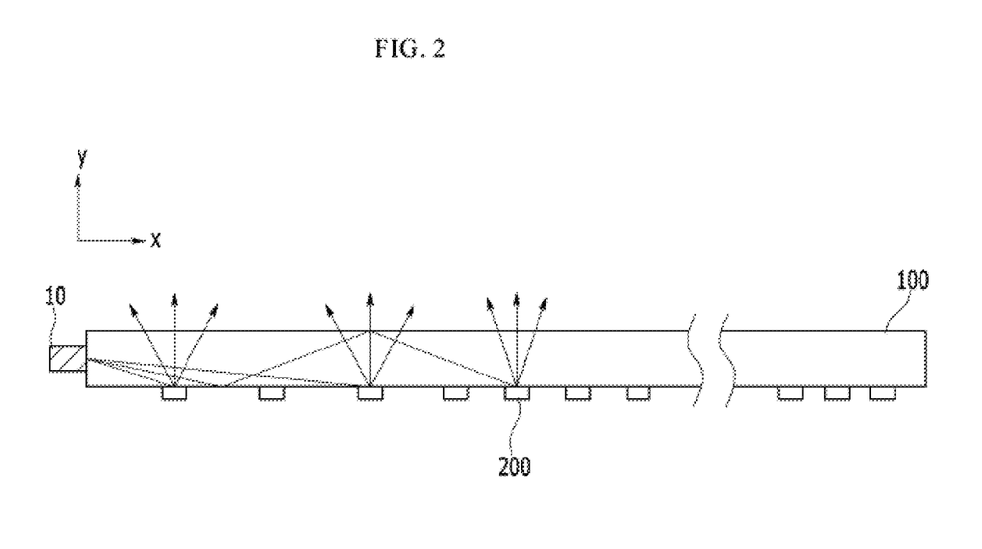
FIG. 2 is a view showing an exemplary light guide according to an example embodiment of the present invention.

As shown in FIG. 2, a light guide according to an example embodiment of the present invention may include a core bar 100 formed of a transparent material extended in a length direction from a first side to a second side and a plurality of reflection parts 200 printed in parallel along with a length direction of the core bar 100 on the outer surface. Spaces between the reflection parts 200 may be the same or decreased from the first side of the core bar toward the second side of the core bar 100.

The core bar 100 may have a bar shape and be extended in the length direction. The core bar may be formed of a transparent material. The term "transparent" refers to a state capable of transmitting light, and as a transmittance is not limited, semi-transparent may also be pertaining to a scope of transparent in the present invention. The length direction means a direction parallel to the direction from one side (first side) to the other side (second side), and referring to FIG. 2, it may be a direction parallel to an x-axis direction.

Preferably, the core bar 100 may be formed of a material having a high transmittance and refractive index. For example, it may include a material including at least one of an acryl-based polymer, polymethylmethacrylate (PMMA), non-yellowing aliphatic thermoplastic polyurethane, polycarbonate, and non-crystalline polyamide. The acryl-based polymer may include an acrylic block copolymer where a PMMA resin and a butyl acrylate rubber may be polymerized to provide a core bar 100. In addition, impact resistance PMMA may be included.

When extruding the core bar 100, a stabilizer including phosphites (a salt or ester of phosphorous acid) may be added in an amount of about 0.05 to 1% based on 100 wt % of the core bar 100 for preventing the process when yellowness due to a heat occurs. The phosphites as used herein may be an antioxidant to provide excellent protection against degradation by heat or light. Meanwhile, the core bar 100 may be formed by a double extrusion, which may prevent the deterioration of light efficiency caused by attaching dusts on the core bar 100. The core bar 100 may be double extruded with a resin having an equivalent or less refractive index for transferring the light source 10. In order to remove dusts, an antistatic agent may be added in an amount of about 0.01 to 10% based on 100 wt % of the core bar 100. The cross-sectional surface of the core bar 100 may have a circular shape having a diameter of about 2.5 to 5.0 mm The reflection parts 200 may be printed parallel to a length direction along with the outer side surface of the core bar 100. The spaces between reflection parts 200 are the same or decreased from one side to the other side of the core bar 100. Preferably, the reflection part 200 may be formed of a light spreading ink composition, for example, by printing or coating. The light spreading ink composition may include an amount of about 20 to 80 wt % of an acryl-based copolymer resin; an amount of about 10 to 70 wt % of a light spreading agent including at least one of a silicone bead and an acrylic bead; and an amount of about 3 to 20 wt % of a light spreading auxiliary agent including at least one of titanium dioxide ($TiO_2$) and zinc oxide (ZnO) based on the total weight of the light spreading in composition. Preferably, an average particle size of the light spreading agent may be about 0.8 to 4.0 μm. In addition, the bead of the light spreading ink composition may be at least one of silicone, PMMA, urethane, and nylon beads. Solvents may be ketones, esters, aromatics, and the like.

When the amount of the light spreading agent is less than the predetermined amount, e.g., less than about 10 wt %, the light may not be scattered, so light may be not diffused. On the other hand, when the amount of the light spreading agent is greater than the predetermined amount, e.g., greater than about 70 wt %, light may be excessively scattered, so only the area where the light source is begun may be brightened, and luminance may be deteriorated as going farther from the light source. In addition, when an average particle size of bead is less than the predetermined size, e.g., less than about 0.8 μm, the light may be insufficiently spread.

On the other hand, when the average particle size is greater than the predetermined size, e.g., greater than about 4.0 μm, the light may be excessively scattered. In other words, the light source may be scattered, and the luminance may be increased at a place where including large bead having an irregular uniformity.

When the amount of the light spreading auxiliary agent is less than the predetermined amount, e.g., less than about 3 wt %, the effects on enlarging the light source 10 reflection and the whitening effect may be insufficient. On the other hand, when the amount of the light spreading auxiliary agent is greater than the predetermined amount, e.g., greater than about 20 wt %, the light may be excessively reflected to rise the luminance. In addition, when the amount of the light spreading agent is greater than the predetermined amount, e.g., greater than 70 wt %, light may be scattered to rise the luminance, and the area where light may be reflected may be widened. When light is irradiated by the light source 10 such as LED disposed at an end portion of the first side of the core bar 100, the light may transmit through the inside of the core bar 100 and propagate toward the other side (second side). In the process of propagating light, the light may be emitted toward an opposite side to the position where the reflection part 200 may be printed through the reflection part 200.

The direction that light is reflected and diffused refers to a front side, and the direction where the reflection part 200 is printed on the core bar 100 refers to a rear side, so the front-rear direction may be a direction parallel to a y-axis direction, referring to FIG. 2. In other words, the light may be reflected and diffused toward a front side from a rear side where the reflection parts 200 are printed. In this case, when the spaces between the reflection parts 200 are printed to be the same or decreased as going from one side to the other side, the light may be reflected or diffused toward the front side through the whole core bar 100, so it may be applicable for a mood lightening as an indirect lightening in a vehicle and an industrial field.

Figure 3:
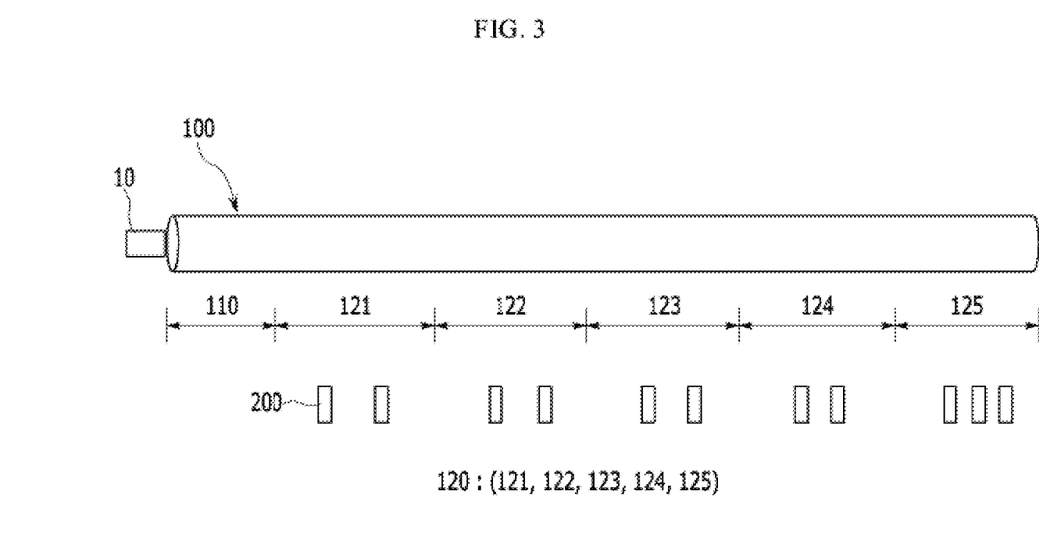
FIG. 3 is a view showing an exemplary light guide according to an example embodiment of the present invention.

As shown in FIG. 3, an exemplary light guide according to an example embodiment of the present invention may be divided into i) an irradiation region 110 disposed end toward the first side of the core bar 100 and not printed with the reflection part 200 and ii) a reflection region 120 disposed on the rest of the core bat toward the second side of the core bar 100 and printed with a plurality of reflection parts 200. Preferably, a length ratio of the irradiation region 110 and the reflection region 120 may be about 1:23 to 1:27. The irradiation region 110 may be a region where any reflection part 200 is not printed for a predetermined period, which is to prevent the hot spot phenomenon.

Meanwhile, when the length ratio of the irradiation region 110 and the reflection region 120 is less than about 1:23, the length of irradiation region 110 may be relatively too long, so a hot spot region does not occur. However, when the length of the irradiation region 110 is too long, light may be reflected on the printing pattern area, so it may cause problems in that the luminance may be low in the irradiation region, but the luminance may be high in the printing region. On the other hand, when the ratio of lengths of the irradiation region 110 and the reflection region 120 is greater than 1:27, the length of the irradiation region 110 may be relatively too short to prevent the hot spot phenomenon.

Meanwhile, the reflection region 120 may be divided into a plurality of regions from one side to the other side. Preferably, the space between the reflection parts printed in a region closer to the second side may be narrower than the space between the reflection parts printed in a region closer to the first region. In addition, the spaces between reflection parts 200 printed in any one region in the plurality of regions may be the same.

For example, it may include the total five regions from the place where the irradiation region 110 is ended, and the reflection region 120 is begun. The space between reflection parts 200 may be narrower as going toward the fifth region 125 in the other side as follows: the space between reflection parts 200 in the second region 122 is formed narrower than in the first region 121; and the space between reflection parts 200 in the third region 123 is formed narrower than in the second region 122. Meanwhile, the plurality of reflection parts 200 printed in any one region may be formed in the same interval therebetween.

By regularly printing the reflection parts 200 as the shape, the light may be reflected and diffused toward the front side through the whole core bar 100.

In this case, the reflection part 200 may have a rectangular shape including a short side and a long side, and the short side of the rectangle may be arranged parallel to a length direction of the core bar 100. Preferably, a ratio of the short side to the long side in the rectangle may be about 1:1.2 to 1:3.

When the ratio of the short side to the long side in the rectangle is less than about 1:1.2, the length of the long side may be relatively too short for light to be reflected and diffused toward the front side. On the other hand, when the ratio of the short side to the long side in the rectangle is greater than about 1:3, the length of the short side may be relatively too short to provide light with a sufficient uniformity through the whole core bar 100.

When the reflection part 200 has a rectangular shape including a long side and a short side, the plurality of regions may be divided into five regions. In the first region 121 from the first side adjacent to the irradiating region 110, a ratio of the short side of the reflection part 200 and the space between reflection parts 200 may be about 1:6 to 1:7.

The first region 121 may correspond to a first period of performing a reflection and a diffusion of light by the reflection part 200 after passing light through the irradiation region 110. When the ratio of the short side of the reflection part 200 and the space between reflection parts 200 is less than about 1:6, the space between reflection parts 200 may be relatively too narrow to propagate light far away along with the core part. On the other hand, when the ratio of the short side of the reflection part 200 and the space between reflection parts 200 is greater than about 1:7, the space between reflection parts 200 may be relatively too far for light to be sufficiently reflected and diffused toward the front.

In the second region 122, a ratio of the short side of the reflection part 200 and the space between reflection parts 200 may be about 1:4 to 1:5. As in above, when a ratio of the short side of the reflection part 200 and the space between reflection parts 200 may be less than about 1:4, the space between reflection parts 200 may be relatively too narrow to propagate light far away along with the core part. On the other hand, a ratio of the short side of the reflection part 200 and the space between reflection parts 200 is greater than about 1:5, the space between reflection parts 200 may be relatively too far for light to be sufficiently reflected and diffused toward the front.

In the third region 123, the ratio of the short side of the reflection part 200 and the space between reflection parts 200 may be about 1:2 to 1:3. When the ratio of the short side of the reflection part 200 and the space between reflection parts 200 is less than 1:2, the space between reflection parts 200 may be relatively too narrow to propagate light far away along with the core part. On the other hand, when the ratio of the short side of the reflection part 200 and the space between reflection parts 200 is greater than about 1:3, the space between reflection parts 200 may be relatively too far for light to be sufficiently reflected and diffused toward the front.

In the fourth region 124, a ratio of the short side of the reflection part 200 and the space between reflection parts 200 may be about 1:1 to 1:1.5. When the ratio of the short side of the reflection part 200 and the space between reflection parts 200 is less than about 1:1, the space between reflection parts 200 may be relatively too narrow to propagate light far away along with the core part. On the other hand, when the ratio of the short side of the reflection part 200 and the space between reflection parts 200 is greater than about 1:1.5, the space between reflection parts 200 may be relatively too far for light to be sufficiently reflected and diffused toward the front.

Last, in the fifth region 124, a ratio of the short side of the reflection part 200 and the space between reflection parts 200 may be about 1:0.5 to 1:1. When the ratio of the short side of the reflection part 200 and the space between reflection parts 200 is less than about 1:1, the space between reflection parts 200 may be relatively too narrow to propagate light far away along with the core part. On the other hand, when the ratio of the short side of the reflection part 200 and the space between reflection parts 200 is greater than about 1:1.5, the space between reflection parts 200 may be relatively too far for light to be sufficiently reflected and diffused toward the front.

Hereinafter, specific examples of the present invention are described. These examples, however, are not in any sense to be interpreted as limiting the scope of the invention.

EXAMPLES

1) Performance Evaluation of Light Guide Shape that Spaces between Reflection Parts were Same or Decreased as Going from One Side to the Other Side As shown in Table 1, a light guide according to an example embodiment of the present invention, a V-cutting shape light guide, a laser light guide without a light diffusion plate, a laser light guide with a light diffusion plate, double-extruded light guide, and a side light emitting optical fiber were compared for the performances thereof.

The luminance was measured at a point of 20 mm, 100 mm, 200 mm, 300 mm, 400 mm, 500 mm, or 600 mm to determine whether it is high luminance and is uniform or not.

The shape of reflection part 200 in the light guide according to an example embodiment of the present invention was a rectangle of 0.4×0.7 mm, and distances between reflection parts 200 at each measurement point were printed at 2.6 mm, 2.1 mm, 1.6 mm, 1 mm, 0.6 mm, 0.4 mm, 0.2 mm which was getting decreased from one side to the other side.

TABLE 1

| | | Luminance measure (cd/m²) | | | | | | | |
|---|---|---|---|---|---|---|---|---|---|
| | | 20 mm | 100 mm | 200 mm | 300 mm | 400 mm | 500 mm | 600 mm | Note |
| Example | Light guide reflection part printing | 450 | 434 | 441 | 451 | 448 | 450 | 437 | high luminance, uniform |
| Comparative Example | V-cutting (No light diffusion plate) | 217 | 84 | 54 | 61 | 57 | 51 | 53 | non-uniform, luminance |
| Comparative Example | Laser (No light diffusion plate) | 242 | 76 | 61 | 63 | 59 | 58 | 55 | non-uniform, luminance |
| Comparative Example | Laser (No light diffusion plate) | 424 | 401 | 389 | 375 | 364 | 351 | 348 | non-uniform |
| Comparative Example | Light guide (double extrusion) | 893 | 646 | 479 | 380 | 277 | 219 | 170 | non-uniform |
| Comparative Example | Side light emitting optical fiber | 234 | 158 | 125 | 110 | 114 | 102 | 91 | non-uniform, luminance |

As shown in Table 1, it was difficult to improve the luminance in the light guides with V-cutting and a laser when the light diffusion plate was not included. A hot spot phenomenon was found in the double extrusion light guide, and it was difficult to provide uniform luminance. Side light emitting optical fiber had insufficient luminance 2) Relationships of Space of reflection parts in Light Guide, Distance from Light Source, and Luminance A light guide according to an example embodiment of the present invention was prepared to have a distance between reflection parts 200 at each region and a ratio of the space between the reflection parts 200 to the short side of the reflection part 200, as shown in Table 2. The main body had a diameter of 3.5 mm, an entire length of 390 mm, and a LED light source 10 was disposed in one side. The reflection part 200 had a rectangular shape of 0.4×0.6 mm.

By irradiating, luminance and a color coordination were measured at 50 mm, 150 mm, 250 mm, and 350 mm. The results are shown in Table 3.

TABLE 2

| | Irradiation region | Reflection region | | | | |
|---|---|---|---|---|---|---|
| | | 1ˢᵗ region | 2ⁿᵈ region | 3ʳᵈ region | 4ᵗʰ region | 5ᵗʰ region |
| Length (mm) | 15 | 75.4 | 74.8 | 75 | 75 | 74.8 |
| Number (ea) | — | 26 | 34 | 53 | 79 | 105 |
| Space (mm) | — | 2.6 | 1.8 | 1 | 0.55 | 0.3 |
| Ratio | — | 6.5 | 4.5 | 2.5 | 1.375 | 0.75 |

TABLE 3

| | | Measurement point | | | |
|---|---|---|---|---|---|
| | | 50 mm | 150 mm | 250 mm | 350 mm |
| Luminance (for CK) (cd/m²) | | 310 | 283 | 316 | 296 |
| Color coordinate (for CK) | X | 0.3226 | 0.319 | 0.315 | 0.329 |
| | Y | 0.3545 | 0.3517 | 0.3467 | 0.3616 |

Figure 4:
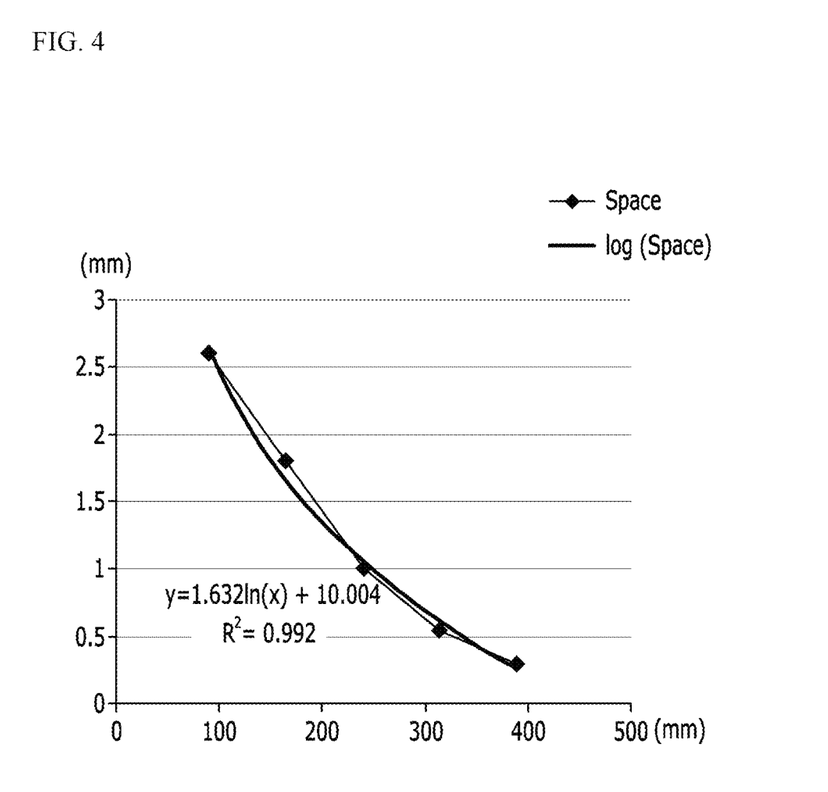
FIG. 4 is a graph showing a relationship of a space between reflection parts to a distance from the light source in an exemplary light guide according to an example embodiment of the present invention.
Figure 5:
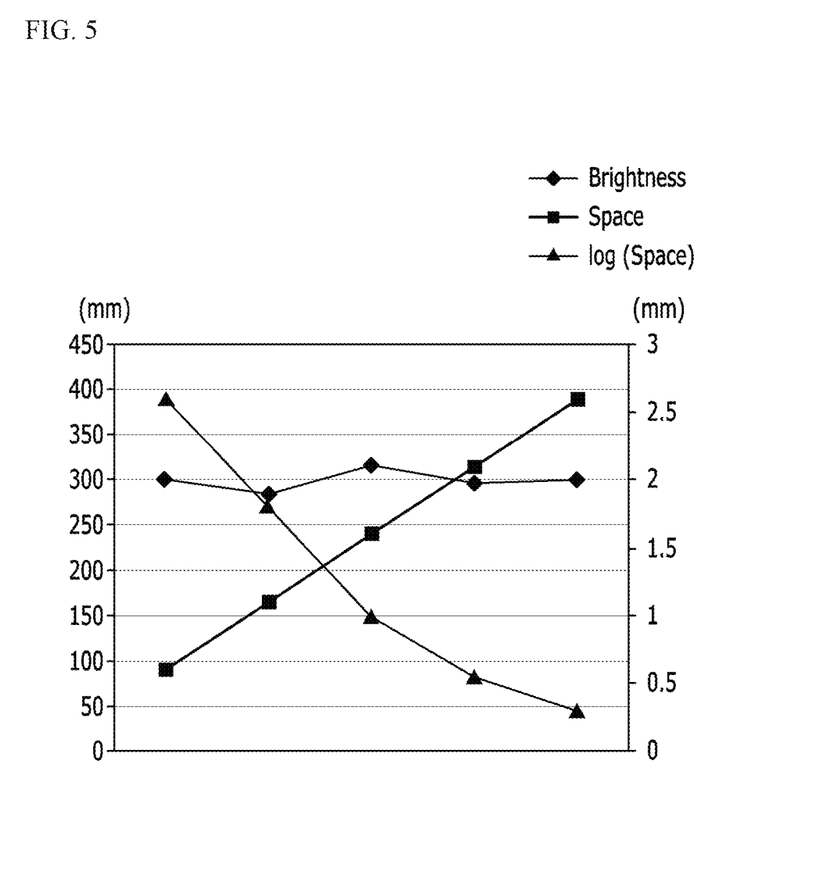
FIG. 5 is a graph showing that a brightness is maintained within a predetermined level, and a luminance deviation is not high, as spaces between reflection parts are decreased even if a distance from a light source is going farther in an exemplary light guide according to an example embodiment of the present invention.

A graph of the relationship of the space between the reflection parts 200 to the distance from the light source 10 in Table 3 is illustrated as in FIG. 4. Thereby, as shown in Table 3 and FIG. 5, it is confirmed that the brightness was maintained within a predetermined level by decreasing the space between the reflection parts 200 even if the distance from the light source 10 was increased, and the luminance deviation was not too high.

While this invention has been described in connection with what is presently considered to be practical example embodiments, it is to be understood that the invention is not limited to the disclosed embodiments and/or examples, but, on the contrary, is intended to cover various modifications and equivalent arrangements included within the spirit and scope of the appended claims. Therefore, the aforementioned embodiments and/or examples should be understood to be exemplary but not limiting the present invention in any way.

10: light source
100: core bar
120: reflection region
110: irradiation region
200: reflection part

What is claimed is:

1. A light guide comprising:
a core bar of a transparent material extended in a length direction from a first side to a second side; and
a plurality of reflection parts printed in parallel along with the length direction of the core bar on the outer surface,
wherein spaces between the reflection parts are the same or decreased from the first side of the core bar toward the second side of the core bar, and
wherein each of the reflection parts comprises a light spreading ink composition comprising:
an amount of about 20 to 80 wt % of an acryl-based copolymer resin;
an amount of about 10 to 70 wt % of a light spreading agent comprising at least one of a silicone bead and an acrylic bead; and
an amount of about 3 to 20 wt % of a light spreading auxiliary agent comprising at least one of titanium dioxide (TiO2) and zinc oxide (ZnO),
all the wt % are based on the total weight of the light spreading ink composition.

2. The light guide of claim 1, wherein the light guide is separated into an irradiation region disposed at an end portion of the first side of the core bar and not printed with the reflection parts; and a reflection region disposed toward the second side of the core bar and printed with the plurality of reflection parts.

3. The light guide of claim 2, wherein a length ratio of the irradiation region and the reflection region is about 1:23 to 1:27.

4. The light guide of claim 2, wherein the reflection region is divided into a plurality of regions from the first side to the second side, and a space between the reflection parts printed in a region towards the second side is narrower than a minimum space between the reflection parts in a region towards the first side, and the space between the reflection parts printed in any one region in the plurality of regions is the same.

5. The light guide of claim 4, wherein each of the reflection parts has a rectangular shape including a long side and a short side, and the short side of the rectangular shape is arranged parallel to the length direction of the core bar.

6. The light guide of claim 5, wherein the rectangular shape has a ratio of a short side and a long side is about 1:1.2 to 1:3.

7. The light guide of claim 5, wherein the plurality of regions are divided into five regions:

in a first region from the first side, a ratio of the short side length of the reflection part and the minimum space between the reflection parts is about 1:6 to 1:7;

in a second region adjacent to the first region from the first side, a ratio of the short side length of the reflection part and the minimum space between the reflection parts is about 1:4 to 1:5;

in a third region adjacent to the second region from the first side, a ratio of the short side length of the reflection part and the minimum space between the reflection parts is about 1:2 to 1:3;

in a fourth region adjacent to the third region from the first side, a ratio of the short side length of the reflection part and the minimum space between the reflection parts is about 1:1 to 1:1.5; and in a fifth region adjacent to the fourth region from the first side, a ratio of the short side length of the reflection part and the minimum space between the reflection parts is about 1:0.5 to 1.1.

8. The light guide of claim 1, wherein an average particle size of the silicone bead and the acrylic bead in the light spreading agent is from about 0.8 to about 4.0 μm.

9. The light guide of claim 1, wherein each of the reflection parts is printed with the light spreading ink composition.

10. A composition for reflecting light, comprising:
an amount of about 20 to 80 wt % of an acryl-based copolymer resin;
an amount of about 10 to 70 wt % of a light spreading agent comprising at least one of a silicone bead and an acrylic bead; and
an amount of about 3 to 20 wt % of a light spreading auxiliary agent comprising at least one of titanium dioxide (TiO2) and zinc oxide (ZnO),
all the wt % are based on the total weight of the light spreading ink composition.

11. The composition of claim 10, wherein an average particle size of the silicone bead and the acrylic bead in the light spreading agent is from about 0.8 to about 4.0 μm.

* * * * *